US012771124B2

(12) United States Patent
Yadav et al.

(10) Patent No.: US 12,771,124 B2
(45) Date of Patent: Oct. 20, 2026

(54) IEC PROTECTION OF HIGH-FREQUENCY TERMINALS

(71) Applicant: QUALCOMM Incorporated, San Diego, CA (US)

(72) Inventors: Kshitij Yadav, San Diego, CA (US); Vijayakumar Dhanasekaran, San Diego, CA (US); Khaled Mahmoud Abdelfattah Aly, Irvine, CA (US); Ramkumar Sivakumar, San Diego, CA (US); Dongyang Tang, San Diego, CA (US); Chienchung Yang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 279 days.

(21) Appl. No.: 18/070,414

(22) Filed: Nov. 28, 2022

(65) Prior Publication Data

US 2024/0178663 A1 May 30, 2024

(51) Int. Cl.
*H02H 9/04* (2006.01)

(52) U.S. Cl.
CPC .................................. *H02H 9/046* (2013.01)

(58) Field of Classification Search
CPC ..................................................... H02H 9/046
See application file for complete search history.

(56) References Cited

U.S. PATENT DOCUMENTS

| | | | | |
|---|---|---|---|---|
| 7,706,114 B2 * | 4/2010 | Huang | H02H 9/046 361/56 |
| 2003/0071662 A1 * | 4/2003 | Kwong | H02H 3/22 327/112 |
| 2008/0316660 A1 * | 12/2008 | Huang | H02H 9/04 361/56 |
| 2018/0158814 A1 * | 6/2018 | Salcedo | H10D 89/713 |
| 2020/0153241 A1 * | 5/2020 | Mathur | H02H 9/04 |
| 2023/0148160 A1 * | 5/2023 | Sivakumar | H02H 9/04 |

FOREIGN PATENT DOCUMENTS

EP 3386056 A1 10/2018

OTHER PUBLICATIONS

International Search Report and Written Opinion—PCT/US2023/037285—ISA/EPO—Mar. 22, 2024.

* cited by examiner

*Primary Examiner* — Crystal L Hammond
*Assistant Examiner* — Samantha L Faubert
(74) *Attorney, Agent, or Firm* — Gerald P. Joyce, III

(57) ABSTRACT

An ESD trigger circuit is provided for protecting a pass transistor coupled to an integrated circuit terminal. The integrated circuit terminal couples through a diode to a voltage node. In response to an electrostatic shock at the integrated circuit terminal, the diode conducts charge to the voltage node to pulse a voltage of the voltage node. The ESD trigger circuit responds to the pulse of the voltage by coupling the voltage node to a gate of the pass transistor.

24 Claims, 7 Drawing Sheets

IEC PROTECTION OF HIGH-FREQUENCY TERMINALS

TECHNICAL FIELD

This application relates to electrostatic discharge (ESD) circuits for protecting terminals according to International Electrotechnical Commission (IEC) standards, and more particularly an ESD circuit that provides IEC protection of high-frequency terminals.

BACKGROUND

The manufacture of integrated circuits and their assembly into electronic devices typically takes place under controlled ESD conditions. Due to the ESD precautions taken during manufacture and assembly, the potential ESD stress from contact with a technician is relatively subdued. To simulate this stress, a human body model (HBM) has been developed. Due to the ESD precautions taken during manufacture and assembly, the stress from the HBM is not as severe as developed by the International Electrotechnical Commission (IEC) for modeling ESD stress that could be subjected to an electronic device by an end user. The levels of voltage and current that an integrated circuit terminal must endure to meet the IEC standards are thus significantly greater than HBM levels.

To meet IEC standards and thus accommodate such high levels of voltage and current, an integrated circuit terminal often couples to a robust ESD clamp circuit (which may also be denoted as an ESD trigger circuit) that may conduct the increased amounts of charge from the integrated circuit terminal to a voltage node such as ground or the power supply voltage rail. A clamp circuit that can safely accommodate IEC levels of charge will typically load the integrated circuit with significant amounts of capacitance. Such elevated capacitive loading by the IEC clamp circuit may result in unacceptable bit error rates for high-speed (and thus high-frequency) data signaling.

SUMMARY

In accordance with an aspect of the disclosure, an electrostatic discharge (ESD) circuit is provided that includes; an integrated circuit terminal; a pass transistor having a drain coupled to the integrated circuit terminal; a voltage node; a first ESD diode coupled between the integrated circuit terminal and the voltage node; and an ESD trigger circuit coupled between a gate of the pass transistor and the voltage node, the ESD trigger circuit being configured to couple the gate of the pass transistor to the voltage node in response to an electrostatic shock of the integrated circuit terminal and to isolate the gate of the pass transistor from the voltage node in an absence of the electrostatic shock of the integrated circuit terminal.

In accordance with another aspect of the disclosure, a method of electrostatic discharge is provided that includes the acts of: receiving a charge at a terminal of an integrated circuit from an electrostatic shock; conducting the charge from the terminal through a diode to a voltage node to pulse a voltage of the voltage node; and coupling the voltage node to a gate of a pass transistor having a drain coupled to the terminal in response to a detection of the pulse of the voltage of the voltage node.

In accordance with yet another aspect of the disclosure, an electrostatic discharge (ESD) circuit is provided that includes: an integrated circuit terminal; a node for a high-speed data signal; a pass transistor coupled between the node for the high-speed data signal and the integrated circuit terminal; and an ESD trigger circuit configured to couple a power supply node for a power supply voltage to a gate of the pass transistor in response to a positive electrostatic shock to the integrated circuit terminal.

In accordance with yet another aspect of the disclosure, an electrostatic discharge (ESD) circuit is provided that includes: an integrated circuit terminal; a node for a high-speed data signal; a pass transistor coupled between the node for the high-speed data signal and the integrated circuit terminal; and an ESD trigger circuit configured to couple a negative voltage node for a negative voltage to a gate of the pass transistor in response to a negative electrostatic shock to the integrated circuit terminal.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

Figure 1:
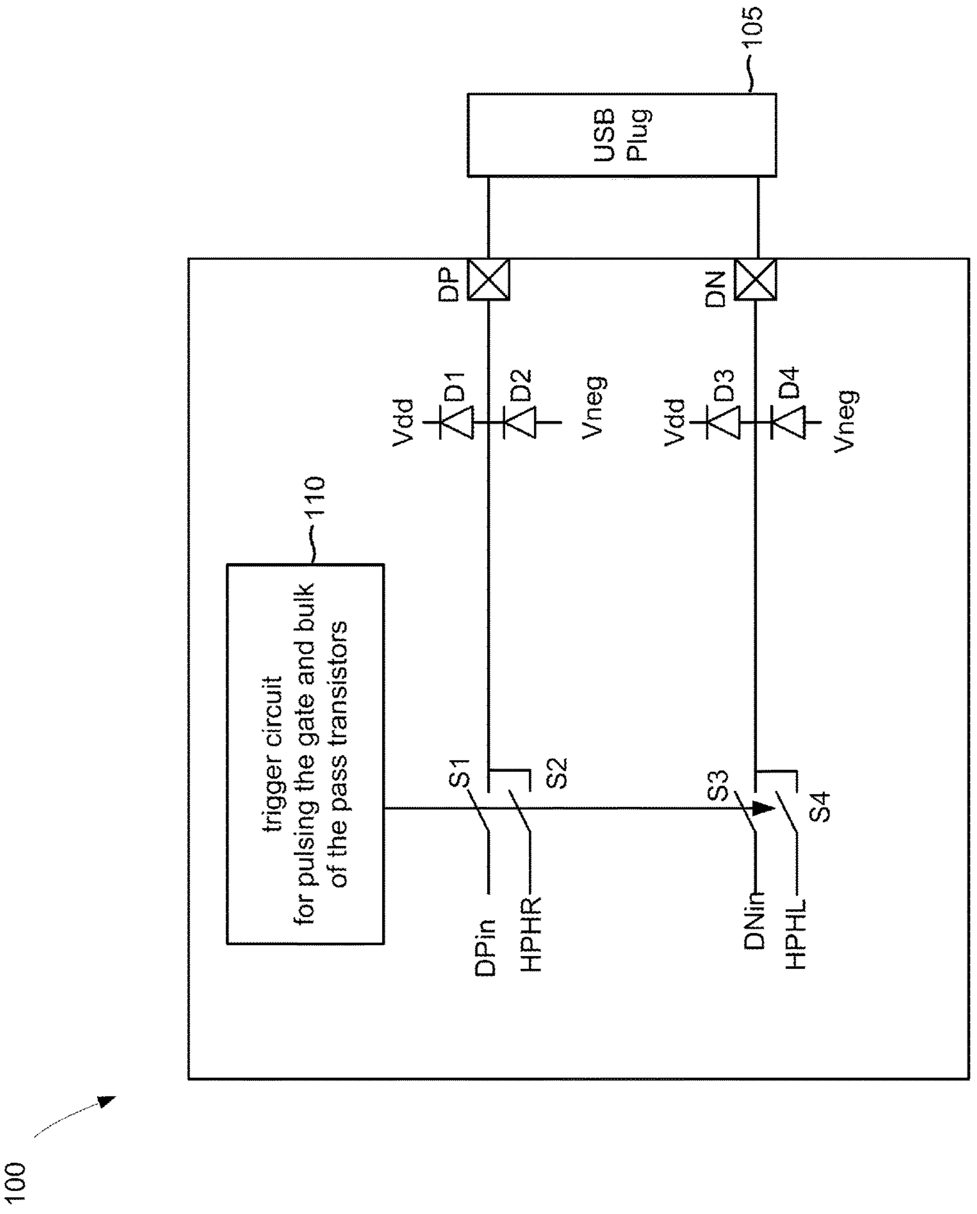
FIG. 1 is a circuit diagram of an integrated circuit including an ESD trigger circuit for pulsing a voltage of the gate and the bulk of pass transistors coupled to integrated circuit terminals in accordance with an aspect of the disclosure.

The increased capacitive loading from an IEC clamp circuit is particularly problematic when a terminal of an integrated circuit is used not only to transmit (or receive) high-speed data during a high-speed data mode of operation but also is used to transmit (or receive) audio signals during an audio mode of operation. A dual-mode integrated circuit 100 is shown in FIG. 1 that has both a high-speed data mode and an audio mode of operation. Integrated circuit 100 includes a differential pair of terminals formed by a universal serial bus (USB) data positive (DP) and a data negative (DN) terminal. An ESD diode D1 has an anode coupled to the DP terminal and a cathode coupled to a node for a power supply voltage Vdd. Similarly, an ESD diode D2 has an anode coupled to a negative voltage node or rail for a negative voltage Vneg and a cathode coupled to the DP terminal. The DN terminal is protected by an analogous pair of ESD diodes D3 and D4. An anode of diode D3 couples to the DN terminal whereas its cathode couples to the power supply node. An anode of diode D4 couples to the negative voltage rail whereas its cathode couples to the DN terminal.

Diodes D1, D2, D3, and D4 protect terminals DP and DN from HBM-levels of charge but do not provide IEC ESD protection. To provide IEC ESD protection, integrated circuit 100 could include ESD clamp circuits that couple to terminals DP and DN. As defined herein, an ESD clamp circuit that can accommodate an IEC amount of electrostatic-induced charge is denoted as an IEC clamp circuit. But such IEC clamp circuits would load terminals DP and DN with several tens of pico-Farads of capacitance as will be discussed further herein. During the high-speed data mode of operation, integrated circuit 100 may generate a DP signal (DPin) that couples through a switch S1 and the DP terminal to an external device (not illustrated) that couples to the DP terminal through a USB plug 105. Similarly, integrated circuit 100 may generate a DN signal (DNin) that couples through switch S3 and the DN terminal to the external device via USB plug 105. Due to the bidirectionality of the DP and DN terminals, the external device may instead drive the DP and DN terminals such that the DPin and DNin signals are received signals rather than being generated by integrated circuit 100.

During the audio mode of operation, integrated circuit 100 may generate a headphone right (HPHR) signal and the headphone left (HPHL) signal. Alternatively, these audio signals may be generated by another integrated circuit and routed to integrated circuit 100. The HPHR signal couples through a switch S2 to the DP terminal. Similarly, the HPHL signal couples through a switch S4 to the DN terminal. Switches S1 and S3 are open during the audio mode of operation. Similarly, switches S2 and S4 are open during the high-speed data mode of operation.

To pass both a strong binary one and a strong binary zero, switches S1 and S3 may be constructed using transmission gates that include both an n-type metal-oxide-semiconductor (NMOS) pass transistor and a p-type metal-oxide-semiconductor (PMOS) pass transistor. Alternatively, switches S1 and S3 may be constructed using just a single pass transistor of either polarity. The pass transistor(s) used to construct switches S1 and S3 are off during the audio mode of operation and on during the high-speed data mode. Switches S2 and S4 may also be constructed using pass transistors. Although the pass transistors forming switches S2 and S4 are off during the high-speed data mode of operation, these pass transistors and the associated audio driving circuitry (not illustrated) load the DP and DN terminals with capacitance. This capacitive loading may thus become untenable should the DP and DN terminals couple to IEC clamp circuits.

To avoid the capacitive loading from an IEC clamp circuit, integrated circuit 100 includes an ESD trigger circuit 110 that reacts to an electrostatic-shock-induced charging of an integrated circuit terminal such as the DP or DN terminal by pulsing the voltage of the gate and bulk of the pass transistors that form the switches coupled to the integrated circuit terminal. ESD trigger circuit 110 may also be denoted as an RC clamp circuit or as an edge-triggered RC clamp circuit. Since ESD trigger circuit 110 does not couple to the DP and DN terminals, these terminals are not loaded with the capacitance of an IEC clamp circuit, yet the pass transistor(s) coupled to the integrated circuit terminal are protected from IEC levels of electrostatic-shock-induced charge.

Figure 2:
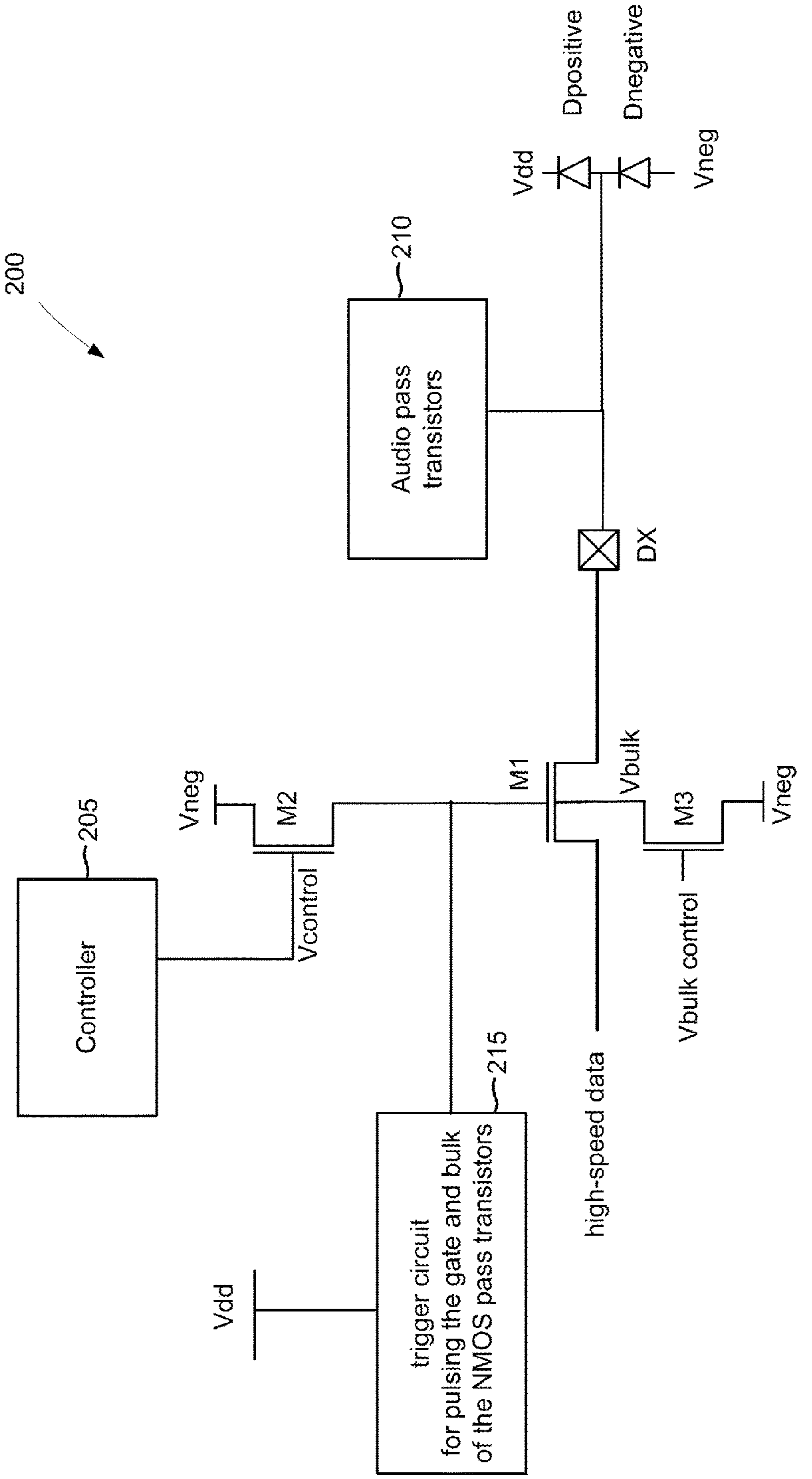
FIG. 2 is a circuit diagram of an integrated circuit with an ESD circuit for protecting an NMOS pass transistor in accordance with an aspect of the disclosure.

To provide a better appreciation of the function of ESD trigger circuit 110, an example NMOS pass transistor M1 in an integrated circuit 200 is shown in FIG. 2. Pass transistor M1 may be used to form switch S1 or S3 as discussed for integrated circuit 100. A plurality of audio pass transistors 210 form switches S2 and S4 as also discussed for integrated circuit 100. A drain of pass transistor M1 and the drains (not illustrated) of the audio pass transistors 210 both couple to an integrated circuit terminal DX. Integrated circuit terminal DX is a generic representation of either of the terminals DP and DN of integrated circuit 100. In that regard, the following discussion will assume that the high-speed data mode of operation is a USB mode of operation. But it will be appreciated that the IEC ESD protection by the ESD trigger circuits disclosed herein may be applied to other types of high-speed data protocols.

In the audio mode of operation, the audio signals that conduct through the audio pass transistors 210 may be either positive or negative in voltage. To assure that pass transistor M1 stays off during the audio mode in the presence of such negative signals, a controller 205 asserts the gate voltage of a transistor M2 that couples between a negative voltage node for a negative voltage Vneg and the gate of the pass transistor M1. In this fashion, the gate of the pass transistor M1 is charged to the negative voltage Vneg during the audio mode of operation to ensure that the pass transistor M1 does not conduct. During a high-speed data mode of operation, controller 205 switches off transistor M2 and switches on another transistor (not illustrated) that couples between the gate of the pass transistor M1 and a power supply node for a power supply voltage Vdd. Pass transistor M1 is thus on during the high-speed data mode of operation so that high-speed data signals may conduct through the pass transistor M1 to the integrated circuit terminal DX. A transistor M3 couples between the bulk of the pass transistor M1 and the negative voltage node. A controller such as controller 205 controls a gate voltage of transistor M3 with a Vbulk control signal so that transistor M3 is on during the audio mode to bias a bulk voltage Vbulk of the pass transistor to the negative voltage Vneg.

Although an electrostatic-shock-induced charging of the DX terminal can be either positive or negative, it can be shown that it is a positive electrostatic charge that poses a danger to an NMOS pass transistor such as pass transistor M1. Conversely, it is a negative electrostatic charge that poses a danger to a PMOS pass transistor (not shown in FIG. 2 but discussed further herein). ESD trigger circuit 110 is generic to the polarity of the pass transistor but in example implementations, there are separate trigger circuits for protecting NMOS pass transistors as compared to trigger circuits for protecting PMOS pass transistors. For pass transistor M1, an NMOS-pass-transistor-protecting ESD trigger circuit 215 couples between the power supply node for the power supply voltage Vdd and the gate of transistor M1. During normal operation (no electrostatic shock of the DX terminal), ESD trigger circuit 215 isolates the power supply node from the gate of the pass transistor M1. However, in response to a positive electrostatic charging of the DX terminal, ESD trigger circuit 215 couples the power supply node to the gate of transistor M1.

To provide additional ESD protection with respect to a positive electrostatic charge, the DX terminal couples to the power supply node through a Dpositive diode that is a generic representation of either diode D1 or diode D3 of integrated circuit 100. Similarly, to provide ESD protection with respect to a negative electrostatic charge, the DX terminal couples to the negative voltage node carrying the negative voltage Vneg through a Dnegative diode that is a generic representation of either diode D2 or diode D4 of integrated circuit 100. In the presence of a positive electrostatic charging of the DX terminal, the Dpositive diode becomes forward biased so that the positive charge conducts to the power supply node. ESD trigger circuit 215 responds to the resulting positive pulsing of the power supply voltage Vdd by coupling the power supply node to the gate of transistor M1. This coupling through ESD trigger circuit 215 causes the gate voltage of the pass transistor M1 to also pulse positively. Since transistor M2 is on, the pulsing of the gate voltage of the pass transistor M1 conducts through transistor M2 to raise the negative voltage of the negative voltage Vneg. With transistor M3 also being on during the audio mode of operation, the positive pulsing of the negative voltage Vneg causes the bulk voltage Vbulk of the pass transistor M1 to also pulse high. In this fashion, the gate-to-drain voltage and gate-to-bulk voltage of the pass transistor M1 are maintained at safe levels despite the DX terminal being suddenly exposed to an IEC level of positive electrostatic charge.

An IEC level of positive electrostatic charge on terminal DX may raise a voltage of the terminal DX to approximately 10 V (albeit briefly). It will be appreciated that this voltage value is exemplary and that other values may be used. Similarly, a negative voltage Vneg of −2 V is also exemplary and may be changed in alternative implementations. If the negative voltage Vneg is −2 V and terminal DX is charged to 10 V, a gate-to-drain voltage of the pass transistor M1 would then be approximately_-12 V without the presence of ESD trigger circuit 215. Such a relatively large gate-to-drain voltage may damage the pass transistor M1. But with the protective action of ESD trigger circuit 215, the gate voltage will also pulse briefly high such as to approximately 7.5 V. The gate-to-drain voltage of the pass transistor M1 is thus approximately just −2.5 V, which is readily tolerated. Similarly, the conduction by ESD trigger circuit 215 may pulse the bulk voltage Vbulk of the pass transistor M1 to approximately 5 V. The bulk-to-drain voltage of the pass transistor in response to the positive electrostatic shock is thus limited to approximately 5 V, which again is tolerated by the pass transistor M1. Note that ESD trigger circuit 215 does not load the DX terminal but instead indirectly detects the pulsing of the DX terminal voltage by detecting the resulting pulsing of the power supply voltage Vdd. In this fashion, ESD trigger circuit 215 advantageously does not load the DX terminal with extra capacitance. In contrast, a traditional IEC clamp circuit would load terminal DX with a substantial amount of capacitance (e.g., tens of pico-Farads). ESD trigger circuit 215 is thus quite advantageous with respect to providing IEC ESD protection without contributing to any capacitive loading of the DX terminal. In this fashion, the DX terminal has a suitably low level of capacitive loading for high-speed data signaling.

Figure 3:
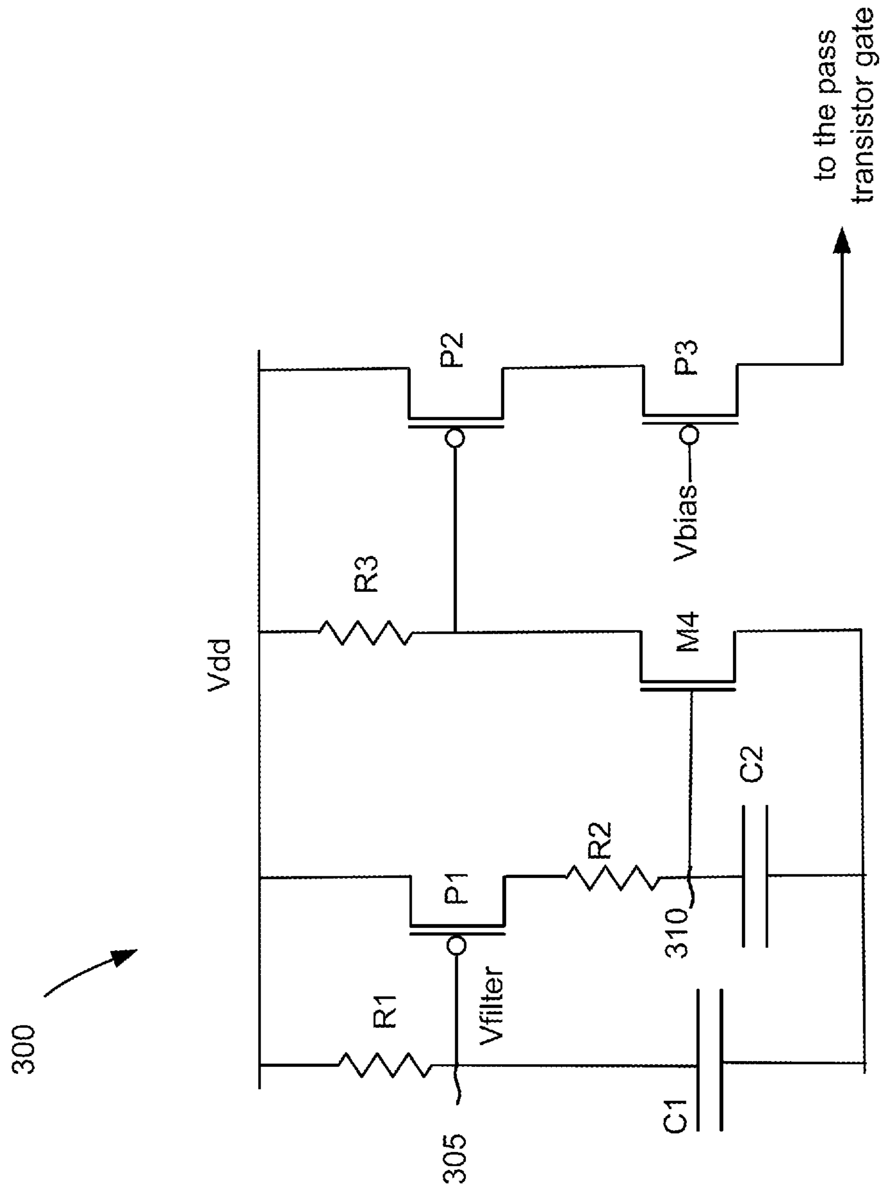
FIG. 3 is a circuit diagram of an example ESD circuit for protecting an NMOS pass transistor in accordance with an aspect of the disclosure.

An example circuit implementation 300 of ESD trigger circuit 215 is shown in FIG. 3. It will be appreciated, however, that numerous alternative implementations are possible to construct an edge-triggered circuit that functions during normal conditions to isolate the power supply node from the pass transistor gate and that responds to a sudden increase in the power supply voltage by coupling the pass transistor gate to the power supply node. ESD trigger circuit 300 includes a low-pass filter, such as the low-pass RC filter formed by serial combination of a resistor R1 and a capacitor C1. Resistor R1 has a terminal coupled to the power supply node for the power supply voltage Vdd. Conversely, capacitor C1 has a terminal coupled to a ground node Vss. Due to the low-pass filtering, a voltage Vfilter at a node 305 between resistor R1 and capacitor C1 will equal the default (non-electrostatically shocked) value of the power supply voltage Vdd. Node 305 couples to a gate of a PMOS transistor P1 having a source coupled to the power supply node. During normal operation, transistor P1 is thus off. In response to a sudden increase in the power supply voltage Vdd, the voltage Vfilter decreases to switch transistor P1 on. A drain of transistor P1 couples through a resistor R2 in series with a capacitor C2 to the ground node. A voltage at a node 310 between resistor R2 and capacitor C2 will thus rise in response to the increase in the power supply voltage Vdd. Node 310 couples to a gate of an NMOS transistor M4 having a source coupled to ground. Transistor M4 will thus switch on in response to the pulsing of the power supply voltage Vdd. A drain of transistor M4 couples through a resistor R3 to the power supply node. The switching on of transistor M4 causes its drain voltage to fall. The drain of transistor M4 couples to a PMOS transistor P2 having a source coupled to the power supply node. The discharging of the drain voltage of transistor M4 in turn causes transistor P2 to switch on. A drain of transistor P2 couples through a PMOS transistor P3 to the pass transistor gate such as the gate of pass transistor M1 (not shown in FIG. 3). Transistor P3 is biased to be in saturation by a bias voltage Vbias. The pass transistor gate will thus be pulsed high by ESD trigger circuit 300 in response to the electrostatic shock of terminal DX. In this fashion, the bulk and gate of the pass transistor protected by ESD trigger circuit 300 will be pulsed high in voltage as discussed for pass transistor M1.

Figure 4:
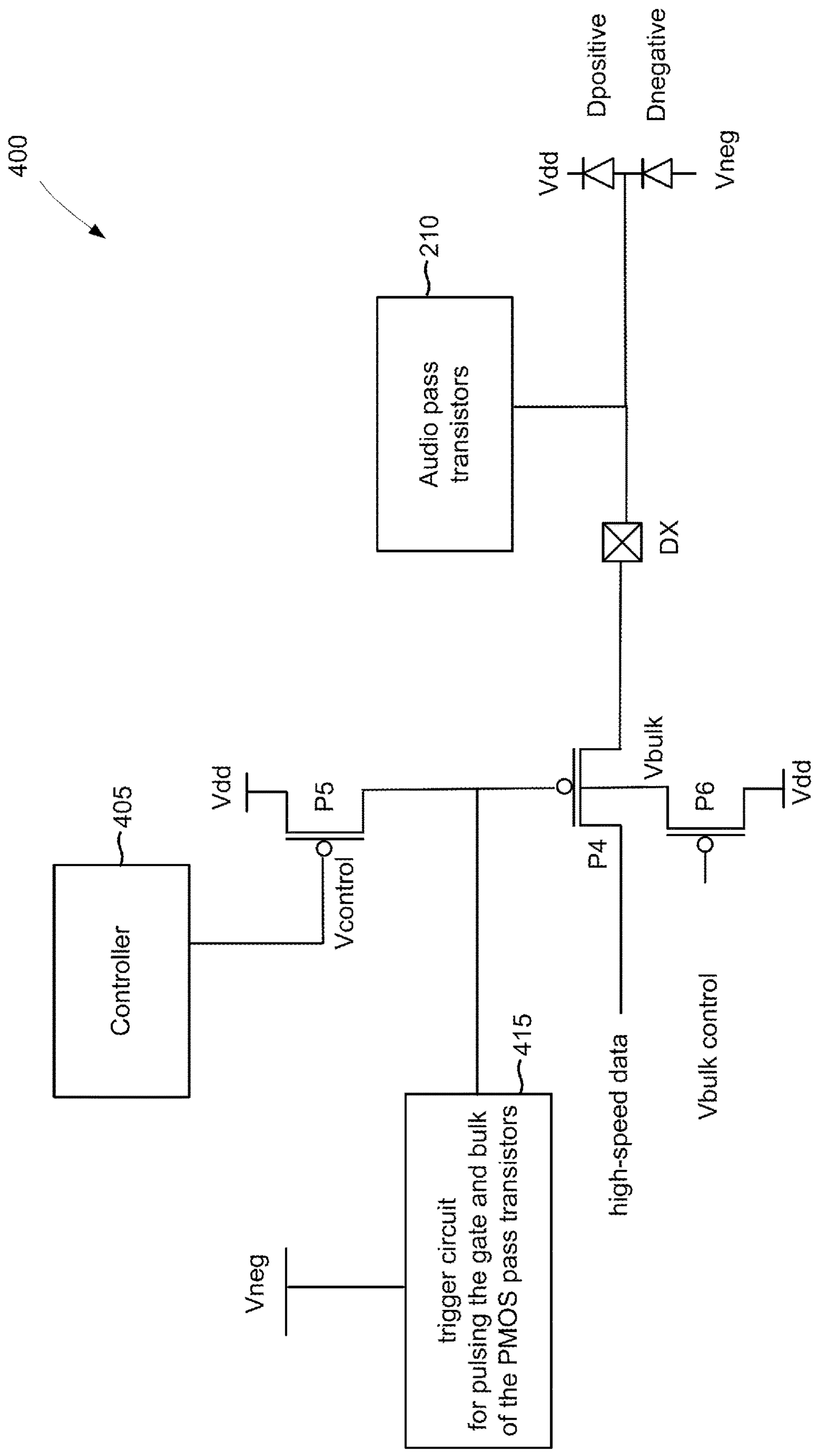
FIG. 4 is a circuit diagram of an integrated circuit with an ESD circuit for protecting a PMOS pass transistor in accordance with an aspect of the disclosure.

As noted earlier, the pass transistor may also be a PMOS transistor. An example PMOS pass transistor P4 in an integrated circuit 400 is shown in FIG. 4. Pass transistor P4 may be used to form switch S1 or S3 as discussed for integrated circuit 100. Audio pass transistors 210 form switches S2 and S4 as also discussed for integrated circuit 100. Should these audio pass transistors 210 be PMOS transistors they may be ESD protected analogously as will be discussed for pass transistor P4. A drain of pass transistor P4 and the drains (not illustrated) of the audio pass transistors 210 both couple to the integrated circuit terminal DX, which is a generic representation of either of the terminals DP and DN of integrated circuit 100. As noted above, it will be appreciated that the IEC ESD protection by the ESD trigger circuits disclosed herein may be applied to other types of high-speed data protocols besides USB.

To assure that pass transistor P4 stays off during the audio mode, a controller 405 grounds the gate voltage Vcontrol of a PMOS transistor P5 that couples between the power supply node and the gate of the pass transistor P4. In this fashion, the gate of the pass transistor P4 is charged to the power supply voltage Vdd during the audio mode of operation to ensure that the pass transistor P4 does not conduct. During a high-speed data mode of operation, controller 405 switches off transistor P5 and switches on another transistor (not illustrated) that couples between the gate of the pass transistor P4 and a ground node. Pass transistor P4 is thus on during the high-speed data mode of operation so that high-speed data signals may conduct through the pass transistor P4 to the integrated circuit terminal DX. A PMOS transistor P6 couples between the bulk of the pass transistor P4 and the power supply node. A controller such as controller 405 controls a gate voltage of transistor P6 with a Vbulk control signal so that transistor P6 is on during the audio mode to bias a bulk voltage Vbulk of the pass transistor P4 to the power supply voltage Vdd.

Although an electrostatic-shock-induced charging of the DX terminal can be either positive or negative, it can be shown that it is a negative electrostatic charge that poses a danger to a PMOS pass transistor such as pass transistor P4. As noted earlier, ESD trigger circuit 110 is generic to the polarity of the pass transistors but in example implementations, there are separate trigger circuits for protecting NMOS pass transistors as compared to ESD trigger circuits for protecting PMOS pass transistors. For pass transistor P4, a PMOS-pass-transistor, ESD trigger circuit 415 couples between the negative voltage node and the gate of the pass transistor P4. During normal operation (no electrostatic shock of the DX terminal), ESD trigger circuit 415 isolates the negative voltage node from the gate of the pass transistor P4. However, in response to a negative electrostatic charging of the DX terminal, ESD trigger circuit 415 couples the negative voltage node to the gate of the pass transistor P4.

To provide additional ESD protection with respect to a negative electrostatic charge, the DX terminal couples to the negative voltage node through a Dnegative diode that is a generic representation of either diode D2 or diode D4 of integrated circuit 100. Similarly, to provide ESD protection with respect to a positive electrostatic charge, the DX terminal couples to the power supply node through a Dpositive diode that is a generic representation of either diode D1 or diode D3 of integrated circuit 100. In the presence of a negative electrostatic charging of the DX terminal, the Dnegative diode becomes forward biased so that the negative charge conducts to the negative voltage node carrying the negative voltage Vneg. A nominal value of the negative voltage may be −2 V but in the presence of the negative electrostatic charging of the DX terminal, the negative voltage may be pulled substantially more negative such as to approximately −10 V. It will be appreciated that such a voltage value is merely exemplary and may be higher or lower depending upon the exact amount of negative electrostatic charge delivered to the DX terminal and the voltage for the negative voltage node. Trigger circuit 415 responds to the resulting negative pulsing of the negative voltage node carrying the negative voltage Vneg by coupling the negative voltage node to the gate of the pass transistor P4. This coupling through ESD trigger circuit 415 causes the gate voltage of the pass transistor P4 to also pulse negatively. Since transistor P5 is on, the negative pulsing of the gate voltage of the pass transistor P4 conducts through transistor P5 to negatively pulse the power supply voltage Vdd. Since transistor P6 is on, the negative pulsing of the DX terminal causes the bulk voltage Vbulk of the pass transistor P4 to also pulse negatively. In this fashion, the gate-to-drain voltage and gate-to-bulk voltage of the pass transistor P4 are kept to safe levels despite the DX terminal being suddenly exposed to an IEC level of negative electrostatic charge. As noted earlier, an IEC level of negative electrostatic charge on terminal DX lowers a voltage of the terminal DX to approximately-10 V (albeit briefly). If the power supply voltage Vdd is 1 V, a gate-to-drain voltage of the pass transistor P4 would then be 11 V without the presence of ESD trigger circuit 415. Such a relatively large gate-to-drain voltage may damage the pass transistor P4. But with the protective action of ESD trigger circuit 415, the gate voltage will also briefly pulse negatively such as to approximately-8 V. The gate-to-drain voltage of the pass transistor P4 is thus approximately just 2 V, which is readily tolerated. Similarly, the conduction by ESD trigger circuit 415 may negatively pulse the bulk voltage Vbulk of the pass transistor P4 to approximately-6 V. The bulk-to-drain voltage of the pass transistor P4 in response to the negative electrostatic shock is thus limited to approximately 4 V, which again is tolerated by the pass transistor P4. Note that ESD trigger circuit 415 does not load the DX terminal but instead indirectly detects the pulsing of the DX terminal voltage by detecting the resulting pulsing of the negative voltage Vneg. In this fashion, trigger circuit 415 advantageously does not load the DX terminal with extra capacitance. In contrast, a traditional IEC clamp circuit would load terminal DX with a substantial amount of capacitance (e.g., tens of pico-Farads). ESD trigger circuit 415 is thus quite advantageous with respect to providing IEC levels of ESD protection without contributing to any significant capacitive loading of the DX terminal. In this fashion, the DX terminal has a suitably low level of capacitive loading for high-speed data signaling.

Figure 5:
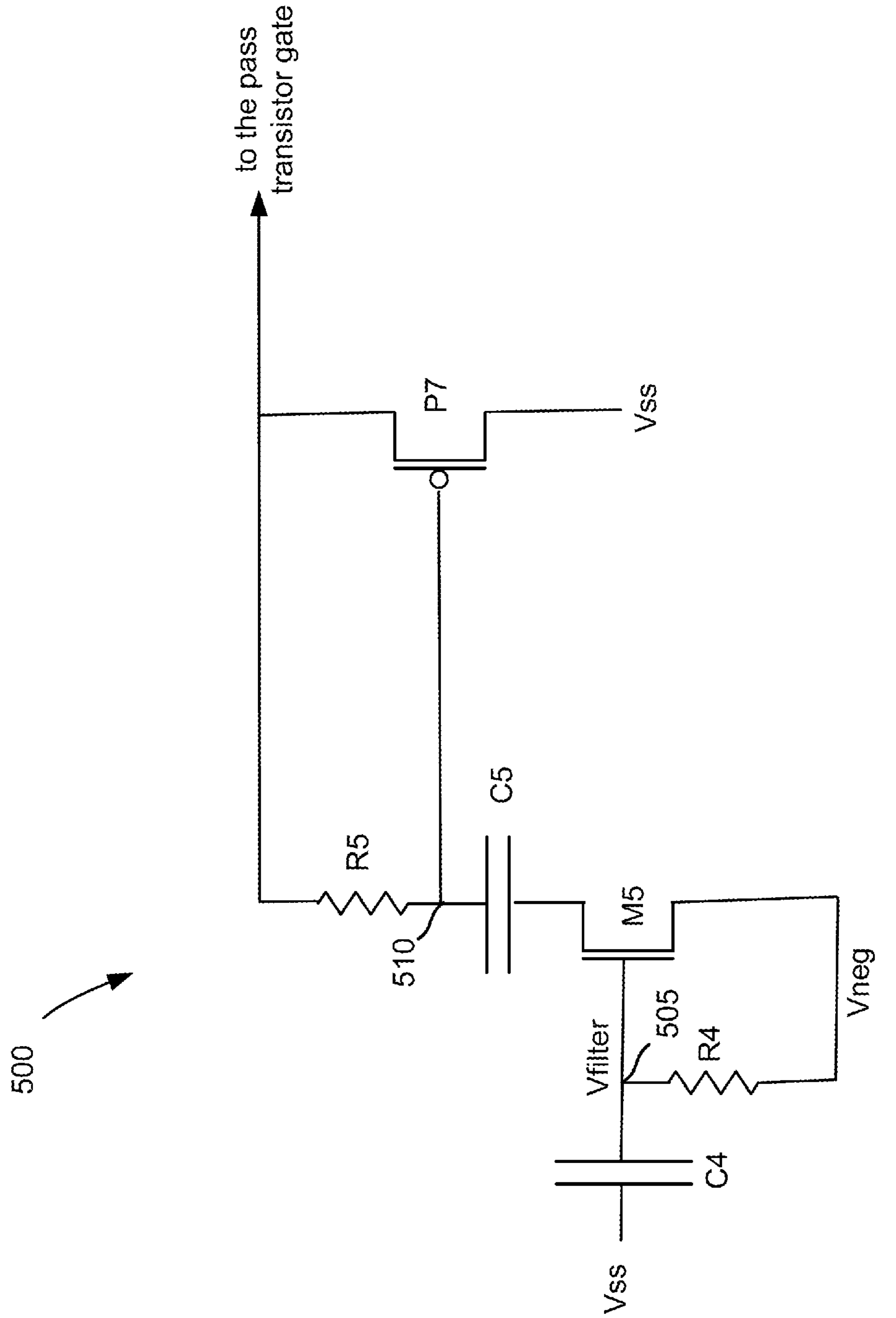
FIG. 5 is a circuit diagram of an example ESD circuit for protecting a PMOS pass transistor in accordance with an aspect of the disclosure.

An example circuit implementation 500 of ESD trigger circuit 415 is shown in FIG. 5. It will be appreciated, however, that numerous alternative implementations are possible to construct an edge-triggered RC clamp circuit that functions during normal conditions to isolate the power supply node from the pass transistor gate and that responds to a sudden increase in the power supply voltage by coupling the pass transistor gate to the power supply node. ESD trigger circuit 500 includes a low-pass filter, such as the low-pass RC filter formed by serial combination of a resistor R4 and a capacitor C4. Resistor R4 has a terminal coupled to the negative voltage node for the negative voltage Vneg. Conversely, capacitor C4 has a terminal coupled to a ground node Vss. Due to the low-pass filtering, a voltage Vfilter at a node 505 between resistor R4 and capacitor C4 will equal the default (non-electrostatically shocked) value of the negative power supply voltage. Node 505 couples to a gate of an NMOS transistor M5 having a source coupled to the negative voltage node. During normal operation, transistor M5 is thus off. In response to a sudden decrease in the negative voltage Vneg, the gate-to-source voltage of transistor M5 rises, which switches on transistor M5 so as to discharge its drain voltage. The drain of transistor M5 couples to a high-pass filter formed by a serial combination of a capacitor C5 and a resistor R5. A terminal of resistor R5 couples to the gate of the PMOS pass transistor (not illustrated) that is protected by ESD trigger circuit 500. A node 510 between resistor R5 and capacitor C5 couples to a gate of a PMOS transistor P7 that has a source coupled to the gate of the PMOS pass transistor and a drain coupled to a ground node. Due to the high-pass filtering by capacitor C5 and resistor R5, the sudden decrease in the drain voltage of transistor M5 causes a sudden decrease in the voltage of node 510, which switches on transistor P7. The gate voltage of the PMOS pass transistor is thus negatively pulsed by ESD trigger circuit 500.

Figure 6:
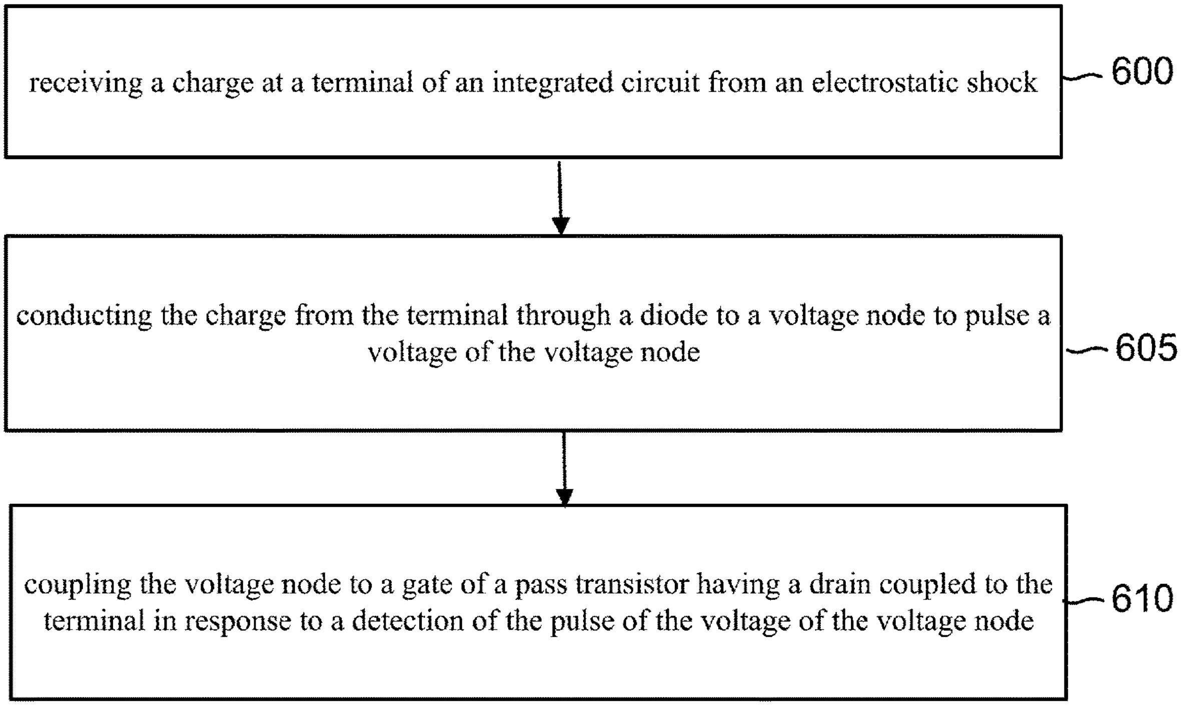
FIG. 6 is a flowchart for a method of operation for an ESD circuit in accordance with an aspect of the disclosure.

A method of operation for an ESD circuit will now be discussed with regard to the flowchart shown in FIG. 6. The method includes an act 600 of receiving a charge at a terminal of an integrated circuit from an electrostatic shock. The charging of terminals DP or DN in integrated circuit 100 of the charging of terminal DX in integrated circuits 200 or 400 is an example of act 600. The method also includes an act 605 of conducting the charge from the terminal through a diode to a voltage node to pulse a voltage of the voltage node. The conducting through the Dpositive diode in integrated circuit 200 to positively pulse the power supply voltage Vdd or through the Dnegative diode in integrated circuit 400 to negatively pulse the negative voltage Vneg is an example of act 605. The method further includes an act 610 of coupling the voltage node to a gate of a pass transistor having a drain coupled to the terminal in response to a detection of the pulse of the voltage of the voltage node. The coupling through ESD trigger circuit 300 or through ESD trigger circuit 500 is an example of act 610.

Figure 7:
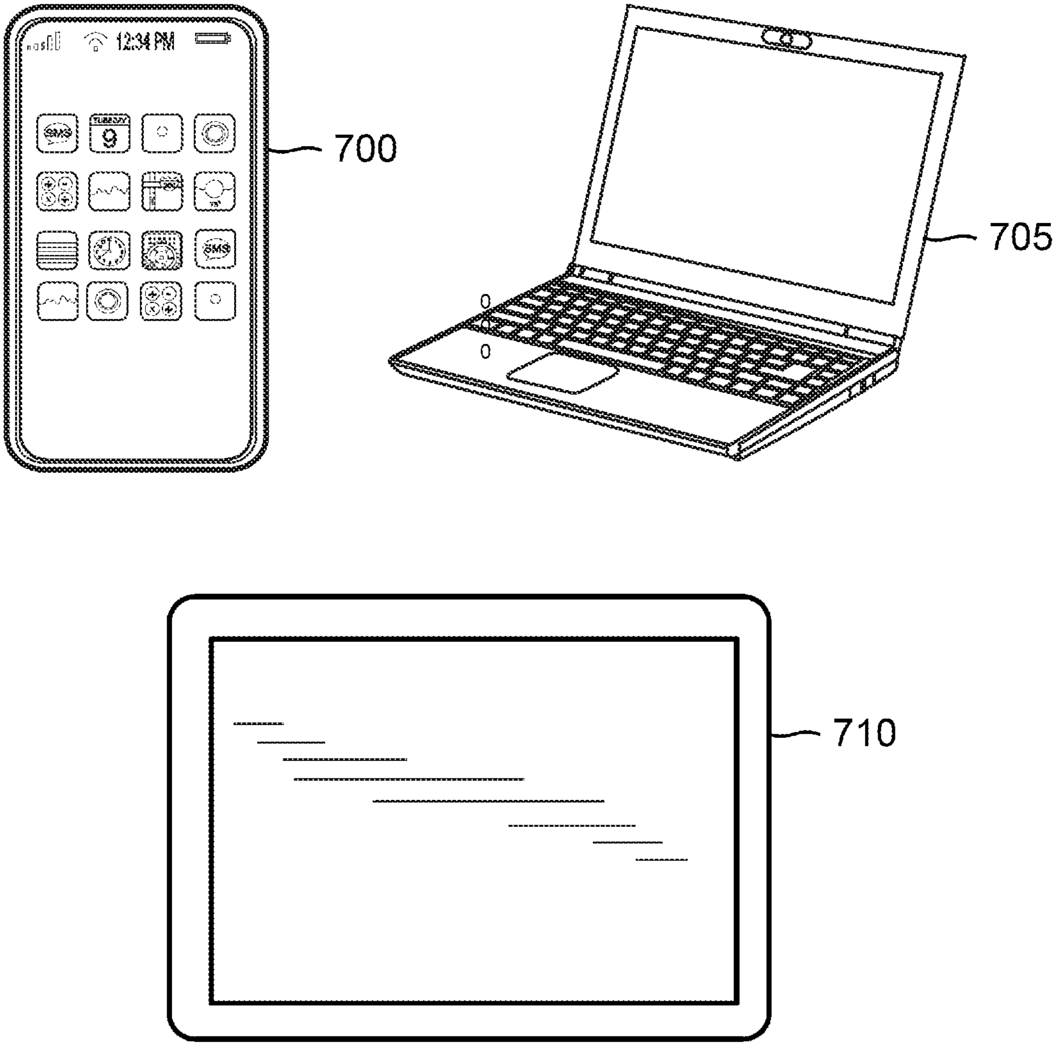
FIG. 7 illustrates some example electronic systems including an ESD circuit in accordance with an aspect of the disclosure.

An ESD circuit as disclosed herein may be incorporated in any suitable mobile device or electronic system. For example, as shown in FIG. 7, a cellular telephone 700, a laptop computer 705, and a tablet PC 710 may all include an ESD circuit in accordance with the disclosure. Other exemplary electronic systems such as a music player, a video player, a communication device, and a personal computer may also be configured with an ESD circuit constructed in accordance with the disclosure.

The disclosure will now be summarized in the following series of clauses:

Clause 1. An electrostatic discharge (ESD) circuit, comprising:
- an integrated circuit terminal;
- a pass transistor having a drain coupled to the integrated circuit terminal;
- a voltage node;
- a first ESD diode coupled between the integrated circuit terminal and the voltage node; and
- an ESD trigger circuit coupled between a gate of the pass transistor and the voltage node, the ESD trigger circuit being configured to couple the gate of the pass transistor to the voltage node in response to an electrostatic shock of the integrated circuit terminal and to isolate the gate of the pass transistor from the voltage node in an absence of the electrostatic shock of the integrated circuit terminal.

Clause 2. The electrostatic discharge circuit of clause 1, wherein the pass transistor is an n-type metal-oxide-semiconductor (NMOS) pass transistor.

Clause 3. The electrostatic discharge circuit of any of clauses 1-2, wherein the voltage node is a power supply node for a power supply voltage.

Clause 4. The electrostatic discharge circuit of any of clauses 1-3, wherein the integrated circuit terminal is a data terminal for a universal serial bus (USB) interface.

Clause 5. The electrostatic discharge circuit of clause 3, further comprising:
- a negative voltage node for a negative voltage; and
- a second ESD diode coupled between the integrated circuit terminal and the negative voltage node.

Clause 6. The electrostatic discharge circuit of clause 5, further comprising:
- a first transistor coupled between the negative voltage node and the gate of the pass transistor; and
- a controller configured to switch on the first transistor to charge the gate of the pass transistor to the negative power supply voltage during an audio mode of operation.

Clause 7. The electrostatic discharge circuit of clause 6, further comprising:
- a second transistor coupled between the negative voltage node and a bulk of the pass transistor, wherein the controller is further configured to switch on the second transistor during the audio mode of operation.

Clause 8. The electrostatic discharge circuit of clause 3, wherein the ESD trigger circuit includes a first PMOS transistor having a source coupled to the power supply node and a drain coupled to the gate of the pass transistor.

Clause 9. The electrostatic discharge circuit of any of clauses 1-9, wherein the ESD trigger circuit further comprises a low-pass filter.

Clause 10. The electrostatic discharge circuit of clause 1, wherein the pass transistor is a PMOS transistor.

Clause 11. The electrostatic discharge circuit of clause 10, wherein the voltage node is a negative voltage node for a negative voltage.

Clause 12. The electrostatic discharge circuit of clause 10, further comprising:
- a second ESD diode coupled between the integrated circuit terminal and a power supply node for a power supply voltage.

Clause 13. The electrostatic discharge circuit of clause 12, further comprising:
- a first PMOS transistor coupled between the gate of the pass transistor and the power supply node; and
- a controller configured to switch on the first PMOS transistor during an audio mode of operation.

Clause 14. The electrostatic discharge circuit of clause 13, further comprising:
- a second PMOS transistor coupled between a bulk of the pass transistor and the power supply node, wherein the controller is further configured to switch on the second PMOS transistor during the audio mode of operation.

Clause 15. A method of electrostatic discharge, comprising;
- receiving a charge at a terminal of an integrated circuit from an electrostatic shock;
- conducting the charge from the terminal through a diode to a voltage node to pulse a voltage of the voltage node; and
- coupling the voltage node to a gate of a pass transistor having a drain coupled to the terminal in response to a detection of the pulse of the voltage of the voltage node.

Clause 16. The method of clause 15, wherein receiving the charge at the terminal comprises receiving a positive charge, and wherein conducting the charge from the terminal through the diode to the voltage node comprises conducting the positive charge from the terminal to a power supply node for a power supply voltage.

Clause 17. The method of clause 15, wherein receiving the charge at the terminal comprises receiving a negative charge, and wherein conducting the charge from the terminal through the diode to the voltage node comprises conducting the negative charge from the terminal to a negative voltage node for a negative voltage.

Clause 18. An electrostatic discharge (ESD) circuit, comprising:
- an integrated circuit terminal;
- a node for a high-speed data signal;
- a pass transistor coupled between the node for the high-speed data signal and the integrated circuit terminal; and
- an ESD trigger circuit configured to couple a power supply node for a power supply voltage to a gate of the pass transistor in response to a positive electrostatic shock to the integrated circuit terminal.

Clause 19. The electrostatic discharge circuit of clause 18, further comprising:
- a diode having an anode coupled to the integrated circuit terminal and a cathode coupled to the power supply node.

Clause 20. The electrostatic discharge circuit of clause 18, wherein the integrated circuit terminal is an integrated circuit terminal for an integrated circuit included within a cellular telephone.

Clause 21. The electrostatic discharge circuit of clause 18, wherein the pass transistor is an NMOS pass transistor.

Clause 22. An electrostatic discharge (ESD) circuit, comprising:
- an integrated circuit terminal;
- a node for a high-speed data signal;

a pass transistor coupled between the node for the high-speed data signal and the integrated circuit terminal; and an ESD trigger circuit configured to couple a negative voltage node for a negative voltage to a gate of the pass transistor in response to a negative electrostatic shock to the integrated circuit terminal.

Clause 23. The electrostatic discharge circuit of clause 22, further comprising:

a diode having an anode coupled to the negative voltage node and a cathode coupled to the integrated circuit terminal.

Clause 24. The electrostatic discharge circuit of clause 22, wherein the pass transistor is a PMOS pass transistor.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

We claim:

1. An electrostatic discharge (ESD) circuit, comprising:

an integrated circuit terminal;

a pass transistor having a drain coupled to the integrated circuit terminal;

a voltage node;

a first ESD diode coupled between the integrated circuit terminal and the voltage node; and an ESD trigger circuit coupled to and between a gate of the pass transistor and the voltage node, the ESD trigger circuit being configured to couple the gate of the pass transistor to the voltage node in response to an electrostatic shock of the integrated circuit terminal and to isolate the gate of the pass transistor from the voltage node in an absence of the electrostatic shock of the integrated circuit terminal, wherein the ESD trigger circuit is configured such that its coupling does not impose a capacitive load on the integrated circuit terminal and the ESD trigger circuit indirectly detects the electrostatic shock of the integrated circuit terminal by detecting a pulsing of a voltage of the voltage node resulting from the electrostatic shock, wherein, during the electrostatic shock, the ESD trigger circuit causes a voltage at the gate of the pass transistor to track the pulsing of the voltage of the voltage node.

2. The electrostatic discharge circuit of claim 1, wherein the pass transistor is an n-type metal-oxide-semiconductor (NMOS) pass transistor.

3. The electrostatic discharge circuit of claim 2, wherein the voltage node is a power supply node and the voltage of the voltage node is a power supply voltage.

4. The electrostatic discharge circuit of claim 3, further comprising:

a negative voltage node for a negative voltage; and a second ESD diode coupled between the integrated circuit terminal and the negative voltage node.

5. The electrostatic discharge circuit of claim 4, further comprising:

a first transistor coupled between the negative voltage node and the gate of the pass transistor; and a controller configured to switch on the first transistor to charge the gate of the pass transistor to the negative voltage and maintain the pass transistor in an off state.

6. The electrostatic discharge circuit of claim 5, further comprising:

a second transistor coupled between the negative voltage node and a bulk of the pass transistor, wherein the controller is further configured to switch on the second transistor while the first transistor is on.

7. The electrostatic discharge circuit of claim 3, wherein the ESD trigger circuit includes a first p-type metal-oxide-semiconductor (PMOS) transistor having a first PMOS transistor source coupled to the power supply node and a first PMOS transistor drain coupled to the gate of the pass transistor.

8. The electrostatic discharge circuit of claim 3, wherein the ESD trigger circuit further comprises a low-pass filter.

9. The electrostatic discharge circuit of claim 2, wherein the integrated circuit terminal is a data terminal of a universal serial bus (USB) interface.

10. The electrostatic discharge circuit of claim 1, wherein the pass transistor is a p-type metal-oxide-semiconductor (PMOS) transistor.

11. The electrostatic discharge circuit of claim 10, wherein the voltage node is a negative voltage node and the voltage of the negative voltage node is a negative voltage.

12. The electrostatic discharge circuit of claim 10, further comprising:

a second ESD diode coupled between the integrated circuit terminal and a power supply node for a power supply voltage.

13. The electrostatic discharge circuit of claim 12, further comprising:

a first transistor coupled between the gate of the pass transistor and the power supply node; and a controller configured to switch on the first transistor to charge the gate of the pass transistor to the power supply voltage and maintain the pass transistor in an off state.

14. The electrostatic discharge circuit of claim 13, further comprising:

a second transistor coupled between a bulk of the pass transistor and the power supply node, wherein the controller is further configured to switch on the second transistor while the first transistor is on.

15. A method of electrostatic discharge (ESD) protection, comprising;

receiving a charge at a terminal from an electrostatic shock;

conducting the charge from the terminal through a diode to a voltage node to pulse a voltage of the voltage node;

coupling the voltage node, through an ESD trigger circuit, to a gate of a pass transistor having a drain coupled to the terminal, the ESD trigger circuit being configured to indirectly detect the electrostatic shock by detecting the pulse of the voltage of the voltage node; and isolating the voltage node from the gate of the pass transistor after a dissipation of the electrostatic shock, wherein the ESD trigger circuit does not impose a capacitive load on the terminal, wherein, during the electrostatic shock, the ESD trigger circuit causes a voltage at the gate of the pass transistor to track the pulse of the voltage of the voltage node.

16. The method of claim 15, wherein receiving the charge at the terminal comprises receiving a positive charge, and wherein conducting the charge from the terminal through the diode to the voltage node comprises conducting the positive charge from the terminal to a power supply node for a power supply voltage.

17. The method of claim 15, wherein receiving the charge at the terminal comprises receiving a negative charge, and wherein conducting the charge from the terminal through the diode to the voltage node comprises conducting the negative charge from the terminal to a negative voltage node for a negative voltage.

18. The method of electrostatic discharge (ESD) protection of claim 15, wherein the terminal is a data terminal of a universal serial bus (USB) interface.

19. An electrostatic discharge (ESD) circuit, comprising:
an integrated circuit terminal;
a diode having an anode coupled to the integrated circuit terminal and a cathode coupled to a power supply node configured to supply a power supply voltage;
a node for a high-speed data signal;
a pass transistor coupled between the node for the high-speed data signal and the integrated circuit terminal; and
an ESD trigger circuit configured to;
couple the power supply node to a gate of the pass transistor in response to a positive electrostatic shock to the integrated circuit terminal,
isolate the gate of the pass transistor from the power supply node in an absence of the positive electrostatic shock,
not impose a capacitive load on the integrated circuit terminal,
indirectly detect the positive electrostatic shock of the integrated circuit terminal by detecting a pulsing of the power supply voltage resulting from the positive electrostatic shock, and
cause a voltage at the gate of the pass transistor to track the pulsing of the power supply voltage.

20. The electrostatic discharge circuit of claim 19, wherein the integrated circuit terminal is a data terminal of a universal serial bus (USB) interface.

21. The electrostatic discharge circuit of claim 19, wherein the pass transistor is an n-type metal-oxide-semiconductor (NMOS) pass transistor.

22. An electrostatic discharge (ESD) circuit, comprising:
an integrated circuit terminal;
a diode having an anode coupled to a negative voltage node configured to supply a negative voltage and a cathode coupled to the integrated circuit terminal;
a node for a high-speed data signal;
a pass transistor coupled between the node for the high-speed data signal and the integrated circuit terminal; and
an ESD trigger circuit configured to:
couple the negative voltage node to a gate of the pass transistor in response to a negative electrostatic shock to the integrated circuit terminal,
isolate the gate of the pass transistor from the negative voltage node in an absence of the negative electrostatic shock,
not impose a capacitive load on the integrated circuit terminal,
indirectly detect the negative electrostatic shock of the integrated circuit terminal by detecting a pulsing of the negative voltage resulting from the negative electrostatic shock, and
cause a voltage at the gate of the pass transistor to track the pulsing of the negative voltage.

23. The electrostatic discharge circuit of claim 22, wherein the pass transistor is a p-type metal-oxide-semiconductor (PMOS) pass transistor.

24. The electrostatic discharge (ESD) circuit of claim 22, wherein the integrated circuit terminal is a data terminal of a universal serial bus (USB) interface.

* * * * *